US008628412B2

(12) United States Patent
Zielinski et al.

(10) Patent No.: US 8,628,412 B2
(45) Date of Patent: Jan. 14, 2014

(54) GAMING SYSTEM, GAMING DEVICE, AND METHOD FOR SIDE WAGERING ON BONUS EVENT OUTCOMES GENERATED IN BONUS EVENTS

(75) Inventors: John H. Zielinski, Reno, NV (US); Mark C. Nicely, Daly City, CA (US); Kevin N. Taylor, Reno, NV (US)

(73) Assignee: IGT, Las Vegas, NV (US)

( * ) Notice: Subject to any disclaimer, the term of this patent is extended or adjusted under 35 U.S.C. 154(b) by 111 days.

(21) Appl. No.: 13/221,409

(22) Filed: Aug. 30, 2011

(65) Prior Publication Data

US 2013/0053130 A1 Feb. 28, 2013

(51) Int. Cl.
*A63F 13/00* (2006.01)

(52) U.S. Cl.
USPC ........................................................ 463/25

(58) Field of Classification Search
USPC ........................................ 463/25, 21, 23, 42
See application file for complete search history.

(56) References Cited

U.S. PATENT DOCUMENTS 4,669,730 A 6/1987 Small
4,743,002 A 5/1988 Menzel
4,856,787 A 8/1989 Itkis
4,922,522 A 5/1990 Scanlon
5,019,973 A 5/1991 Wilcox et al.
5,178,395 A 1/1993 Lovell
5,248,142 A 9/1993 Breeding
5,288,081 A 2/1994 Breeding
5,393,057 A 2/1995 Marnell, II
5,393,067 A 2/1995 Paulsen et al.
5,415,416 A 5/1995 Scagnelli et al.
5,472,194 A 12/1995 Breeding et al.
5,531,448 A 7/1996 Moody
5,544,892 A 8/1996 Breeding
5,632,485 A 5/1997 Woodland et al.
5,673,917 A 10/1997 Vancura
5,720,662 A 2/1998 Holmes, Jr. et al.
5,732,950 A 3/1998 Moody
5,788,574 A 8/1998 Ornstein et al.
5,823,873 A 10/1998 Moody
5,839,730 A 11/1998 Pike
5,848,932 A 12/1998 Adams
5,851,148 A 12/1998 Brune et al.

(Continued)

FOREIGN PATENT DOCUMENTS

WO WO9609102 3/1996
WO WO9719736 6/1997

(Continued)

*Primary Examiner* — Arthur O. Hall
*Assistant Examiner* — Allen Chan
(74) *Attorney, Agent, or Firm* — Neal, Gerber & Eisenberg LLP

(57) ABSTRACT

In one embodiment, the gaming system enables a player to place one or more side bets on one or more outcomes associated with one or more bonus events, wherein the player participates in each of such bonus event(s) regardless of when that bonus event is triggered and regardless of which gaming device(s) in the gaming system is associated with the triggering of that bonus event. In another embodiment, the gaming system enables a player to place a side bet which is associated with an eligibility period, such as a designated period of time or a designated quantity of games played. If no bonus events are triggered during the associated eligibility period, the placed side bet is lost and the gaming system does not provide the player any bonus event awards in association with the placed side bet.

20 Claims, 9 Drawing Sheets

(56) References Cited

U.S. PATENT DOCUMENTS

| | | | |
|---|---|---|---|
| 5,890,962 A | 4/1999 | Takemoto | |
| 5,967,896 A | 10/1999 | Jorasch et al. | |
| 6,019,374 A | 2/2000 | Breeding | |
| 6,056,641 A | 5/2000 | Webb | |
| 6,068,552 A | 5/2000 | Walker et al. | |
| 6,079,711 A | 6/2000 | Wei et al. | |
| 6,089,978 A | 7/2000 | Adams | |
| 6,110,041 A | 8/2000 | Walker et al. | |
| 6,120,378 A | 9/2000 | Moody et al. | |
| 6,149,522 A | 11/2000 | Alcorn et al. | |
| 6,159,095 A | 12/2000 | Frohm et al. | |
| 6,179,711 B1 | 1/2001 | Yoseloff | |
| 6,203,428 B1 | 3/2001 | Giobbi et al. | |
| 6,203,429 B1 | 3/2001 | Demar et al. | |
| 6,210,277 B1 | 4/2001 | Stefan | |
| 6,227,969 B1 | 5/2001 | Yoseloff | |
| 6,237,916 B1 | 5/2001 | Webb | |
| 6,254,481 B1 | 7/2001 | Jaffe | |
| 6,264,561 B1 | 7/2001 | Saffari et al. | |
| 6,270,411 B1 | 8/2001 | Gura et al. | |
| 6,290,600 B1 | 9/2001 | Glasson | |
| 6,334,814 B1 | 1/2002 | Adams | |
| 6,336,857 B1 | 1/2002 | McBride | |
| 6,358,146 B1 | 3/2002 | Adams | |
| 6,394,902 B1 | 5/2002 | Glavich et al. | |
| 6,394,907 B1 | 5/2002 | Rowe | |
| 6,398,645 B1 | 6/2002 | Yoseloff | |
| 6,419,579 B1 | 7/2002 | Bennett | |
| 6,425,823 B1 | 7/2002 | Byrne | |
| 6,443,841 B1 | 9/2002 | Rossides | |
| 6,511,068 B1 | 1/2003 | Sklansky et al. | |
| 6,517,073 B1 | 2/2003 | Vancura | |
| 6,520,856 B1 | 2/2003 | Walker et al. | |
| 6,523,829 B1 | 2/2003 | Walker et al. | |
| 6,561,904 B2 | 5/2003 | Locke et al. | |
| 6,607,195 B2 | 8/2003 | Vancura | |
| 6,652,378 B2 | 11/2003 | Cannon et al. | |
| 6,656,040 B1 | 12/2003 | Brosnan et al. | |
| 6,656,044 B1 | 12/2003 | Lewis | |
| 6,663,488 B1 | 12/2003 | Adams | |
| 6,679,497 B2 | 1/2004 | Walker et al. | |
| 6,685,567 B2 | 2/2004 | Cockerille et al. | |
| 6,692,003 B2 | 2/2004 | Potter et al. | |
| 6,695,696 B1 | 2/2004 | Kaminkow | |
| 6,702,289 B1 | 3/2004 | Feola | |
| 6,726,565 B2 | 4/2004 | Hughs-Baird | |
| 6,746,328 B2 | 6/2004 | Cannon et al. | |
| 6,789,801 B2 | 9/2004 | Snow | |
| 6,793,578 B2 | 9/2004 | Luccesi et al. | |
| 6,804,763 B1 | 10/2004 | Stockdale et al. | |
| 6,827,646 B2 | 12/2004 | Adams | |
| 6,863,608 B1 | 3/2005 | LeMay et al. | |
| 6,866,586 B2 | 3/2005 | Oberberger et al. | |
| 7,029,395 B1 | 4/2006 | Baerlocher | |
| 7,111,845 B2 | 9/2006 | Walker et al. | |
| 7,201,654 B1 | 4/2007 | Jarvis et al. | |
| 7,226,358 B2 | 6/2007 | Miller et al. | |
| 7,329,179 B2 | 2/2008 | Baerlocher | |
| 7,351,146 B2 | 4/2008 | Kaminkow | |
| 7,425,177 B2 | 9/2008 | Rodgers et al. | |
| 7,427,236 B2 | 9/2008 | Kaminkow et al. | |
| 7,429,215 B2 | 9/2008 | Rozkin et al. | |
| 7,503,849 B2 | 3/2009 | Hornik et al. | |
| 7,594,851 B2 | 9/2009 | Falconer | |
| 7,837,554 B2 | 11/2010 | Kaminkow et al. | |
| 7,841,939 B2 | 11/2010 | Baerlocher et al. | |
| 7,931,532 B2 * | 4/2011 | Johnson | 463/27 |
| 7,980,948 B2 | 7/2011 | Rowe et al. | |
| 2002/0045474 A1 | 4/2002 | Singer et al. | |
| 2002/0077170 A1 * | 6/2002 | Johnson et al. | 463/16 |
| 2002/0094869 A1 | 7/2002 | Harkham | |
| 2003/0003989 A1 * | 1/2003 | Johnson | 463/25 |
| 2003/0060268 A1 | 3/2003 | Falconer | |
| 2003/0073497 A1 | 4/2003 | Nelson | |
| 2003/0144053 A1 | 7/2003 | Michaelson | |
| 2003/0203756 A1 | 10/2003 | Jackson | |
| 2004/0002379 A1 | 1/2004 | Parrott et al. | |
| 2004/0063492 A1 | 4/2004 | Baerlocher et al. | |
| 2004/0070146 A1 | 4/2004 | Snow | |
| 2004/0072619 A1 | 4/2004 | Brosnan et al. | |
| 2004/0084843 A1 | 5/2004 | Snow | |
| 2004/0090003 A1 | 5/2004 | Snow | |
| 2004/0090005 A1 | 5/2004 | Snow | |
| 2004/0106446 A1 | 6/2004 | Cannon et al. | |
| 2004/0147314 A1 | 7/2004 | LeMay et al. | |
| 2004/0152509 A1 | 8/2004 | Hornik et al. | |
| 2005/0003886 A1 | 1/2005 | Englman et al. | |
| 2005/0085288 A1 | 4/2005 | Schugar et al. | |
| 2005/0192099 A1 | 9/2005 | Nguyen et al. | |
| 2005/0233803 A1 | 10/2005 | Yang | |
| 2005/0239542 A1 | 10/2005 | Olsen | |
| 2006/0040732 A1 | 2/2006 | Baerlocher et al. | |
| 2006/0073882 A1 | 4/2006 | Rozkin et al. | |
| 2006/0128457 A1 | 6/2006 | Cannon | |
| 2006/0211473 A1 | 9/2006 | Walker et al. | |
| 2006/0247010 A1 | 11/2006 | Gagner | |
| 2006/0247011 A1 * | 11/2006 | Gagner | 463/20 |
| 2006/0247029 A1 | 11/2006 | Walker et al. | |
| 2007/0054726 A1 | 3/2007 | Muir et al. | |
| 2007/0060314 A1 | 3/2007 | Baerlocher et al. | |
| 2007/0060321 A1 | 3/2007 | Vasquez et al. | |
| 2007/0102877 A1 | 5/2007 | Personius et al. | |
| 2007/0155482 A1 | 7/2007 | Walker et al. | |
| 2007/0155483 A1 | 7/2007 | Walker et al. | |
| 2007/0155484 A1 | 7/2007 | Walker et al. | |
| 2007/0167211 A1 * | 7/2007 | Rodgers et al. | 463/16 |
| 2007/0191088 A1 | 8/2007 | Breckner et al. | |
| 2007/0243925 A1 | 10/2007 | LeMay et al. | |
| 2007/0273097 A1 | 11/2007 | Kirkutis | |
| 2007/0293293 A1 | 12/2007 | Baerlocher et al. | |
| 2008/0067745 A1 | 3/2008 | Wikstrom | |
| 2008/0076496 A1 | 3/2008 | Baerlocher et al. | |
| 2008/0076531 A1 | 3/2008 | Baerlocher et al. | |
| 2008/0076532 A1 | 3/2008 | Graham et al. | |
| 2008/0076542 A1 | 3/2008 | Iddings et al. | |
| 2008/0108401 A1 * | 5/2008 | Baerlocher et al. | 463/12 |
| 2008/0108425 A1 | 5/2008 | Oberberger | |
| 2008/0146344 A1 | 6/2008 | Rowe et al. | |
| 2009/0042644 A1 * | 2/2009 | Zielinski | 463/27 |
| 2009/0042645 A1 | 2/2009 | Graham et al. | |
| 2009/0111574 A1 | 4/2009 | Rowe | |
| 2009/0117993 A1 * | 5/2009 | Bigelow et al. | 463/22 |
| 2009/0325686 A1 | 12/2009 | Davis et al. | |
| 2010/0285860 A1 | 11/2010 | Svanas | |

FOREIGN PATENT DOCUMENTS

| | | |
|---|---|---|
| WO | WO9727570 | 7/1997 |
| WO | WO9910849 | 3/1999 |
| WO | WO02099760 | 12/2002 |

* cited by examiner

GAMING SYSTEM, GAMING DEVICE, AND METHOD FOR SIDE WAGERING ON BONUS EVENT OUTCOMES GENERATED IN BONUS EVENTS

CROSS REFERENCE TO RELATED APPLICATIONS

This application relates to the following co-pending commonly owned patent applications: "GAMING SYSTEM, GAMING DEVICE, AND METHOD FOR SIDE WAGERING ON OCCURRENCES OF BONUS EVENTS," Ser. No. 13/221,438.

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a primary or base wager to activate the primary or base game. In many of these gaming machines, the award is based on the player obtaining a winning symbol or symbol combination and on the amount of the primary or base wager (e.g., the higher the wager, the higher the award). Symbols or symbol combinations which are less likely to occur usually provide higher awards.

In such known gaming machines, the amount of the primary or base wager made on the base game by the player may vary. For instance, the gaming machine may enable the player to wager a minimum number of credits, such as one credit (e.g., one cent, nickel, dime, quarter or dollar) up to a maximum number of credits, such as five credits. This wager may be made by the player a single time or multiple times in a single play of the primary game. For instance, a slot game may have one or more paylines and the slot game may enable the player to make a wager on each payline in a single play of the primary game. Thus, it is known that a gaming machine, such as a slot game, may enable players to make wagers of substantially different amounts on each play of the primary or base game ranging, for example, from one credit up to 125 credits (e.g., five credits on each of 25 separate paylines). This is also true for other wagering games, such as video draw poker, where players can wager one or more credits on each hand and where multiple hands can be played simultaneously.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machines generally indicates this to the player through one or more visual and/or audio output devices, such as the reels, lights, speakers, and video screens. Part of the enjoyment and excitement of playing certain gaming machines is the occurrence or triggering of the secondary or bonus game (even before the player knows how much the bonus award will be). In other words, obtaining a bonus event and a bonus award in the bonus event is part of the enjoyment and excitement for players.

Side bets or side wagers are also known in gaming machines. Side bets enable a player to place one or more wagers on one or more aspects of a player's gaming experience which is in addition to any primary or base game wager. In one form, a side bet is directed to a specific feature or function that the player desires, such as a side wager on a bonus game, a side wager to be eligible to win a progressive award or a side wager on the result of another game being played by another player at another gaming machine.

In certain known side bet systems, a static relationship exists between each of the gaming machines in a gaming establishment or casino and the side bets associated with that gaming machine. Specifically, a player at a specific gaming machine may only place the dedicated side bets associated with that specifically played gaming machine. That is, known gaming machines are pre-configured for specific side bets because the side bet is accounted for in the programming of the gaming machine (which resides at the gaming machine). Moreover, known gaming machines are further pre-configured for specific side bets because these gaming machines are designed with a dedicated side bet button as part of the button panel.

There is a continuing need to provide new and different gaming machines and gaming systems as well as new and different ways to provide awards to players utilizing side bets. There is also a continuing need to provide great opportunities to players for community play bonus experiences

SUMMARY

The present disclosure relates generally to gaming systems, gaming devices, and methods for providing side wagering.

In various embodiments, the gaming system enables a player to place a side bet or side wager on one or more outcomes associated with one or more bonus events, whenever the side-wagered on bonus events are subsequently triggered. In one embodiment, the gaming system enables a player to place a side wager on a specific outcome being generated in one or more bonus events subsequently triggered in association with one or more gaming devices of a designated group of gaming devices. In one such embodiment, the gaming system enables a player to place a side wager on a specific outcome being generated in each of a quantity of one or more bonus events which will occur, at a known or unknown future point in time, in association with a specific gaming device or a specific group of gaming devices. For example, the gaming system enables a player to place a side wager on the next spin of a bonus wheel associated with the player's own gaming device. In another such embodiment, the gaming system enables a player to place a side wager on a specific outcome being generated in each of a quantity of one or more bonus events which will occur, at a known or unknown future point in time, in association with any gaming device in the gaming system. For example, the gaming system enables a player to place a side wager on each of the next five spins of any bonus wheel triggered at any gaming device in the gaming establishment.

In these embodiments, upon the triggering of each of such side-wagered on bonus events (either at the player's own gaming device or at another participating gaming device in the gaming system), the gaming system enables the player to participate in the triggered bonus event. If the specific side wagered on outcome is generated in the triggered bonus event, the gaming system provides the player a bonus event award. Accordingly, rather than merely enabling a first player at a first gaming device to place a side bet on the result of a specific game currently being played by a second player at a second gaming device, the gaming system disclosed herein enables a first player at a first gaming device to place a side bet on the result of one or more subsequent bonus events (whenever such bonus events occur) triggered by either the first gaming device, a specific second gaming device or any other participating gaming device in the gaming system. The gaming system and method of this embodiment of the present disclosure is thus configured to enable a player to place one or more side bets on one or more outcomes associated with one or more bonus events, wherein the player participates in each of such bonus event(s) regardless of when that bonus event is triggered and regardless of which gaming device(s) in the gaming system is associated with the triggering of that bonus event. Such a gaming system increases a level of excitement and enjoyment for players by enabling a player to place a side bet to qualify to participate in one or more bonus events as soon as such bonus event(s) occur.

In various other embodiments, the gaming system enables a player to place a side bet which is associated with an eligibility period, such as a designated period of time or a designated quantity of games played. In one such embodiment, if one or more bonus events are triggered (at the player's own gaming device and/or at another participating gaming device in the gaming system) during the associated eligibility period, the gaming system provides the player one or more bonus event awards in association with the placed side bet. On the other hand, if no bonus events are triggered during the associated eligibility period, the placed side bet is lost and the gaming system does not provide the player any bonus event awards in association with the placed side bet. In another such embodiment, each side bet placed is also associated with a specific outcome. In this embodiment, if one or more bonus events are triggered (at the player's own gaming device and/or at another participating gaming device in the gaming system) during the associated eligibility period, the gaming system qualifies the player to participate in the triggered bonus event(s). Such participation includes the gaming system providing the player a bonus event award if the specific side-wagered on outcome is generated in the triggered bonus event. On the other hand, if no bonus events are triggered during the associated eligibility period or if the specific side-wagered on outcome is not generated in any bonus events triggered during the associated eligibility period, the placed side bet is lost and the gaming system does not provide the player any bonus event award in association with the placed side bet. These gaming systems and methods of these embodiments of the present disclosure are thus configured to enable a player to place one or more side bets associated with one or more bonus events, wherein the player's actual participation in the bonus event is conditioned upon the bonus event actually occurring during an eligibility period associated with the placed side bet. Such gaming systems increase a level of excitement and enjoyment for players by enabling a player to place a side bet on a bonus event which may or may not occur during a designated period of time.

Additional features and advantages are described in, and will be apparent from, the following Detailed Description and the figures.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
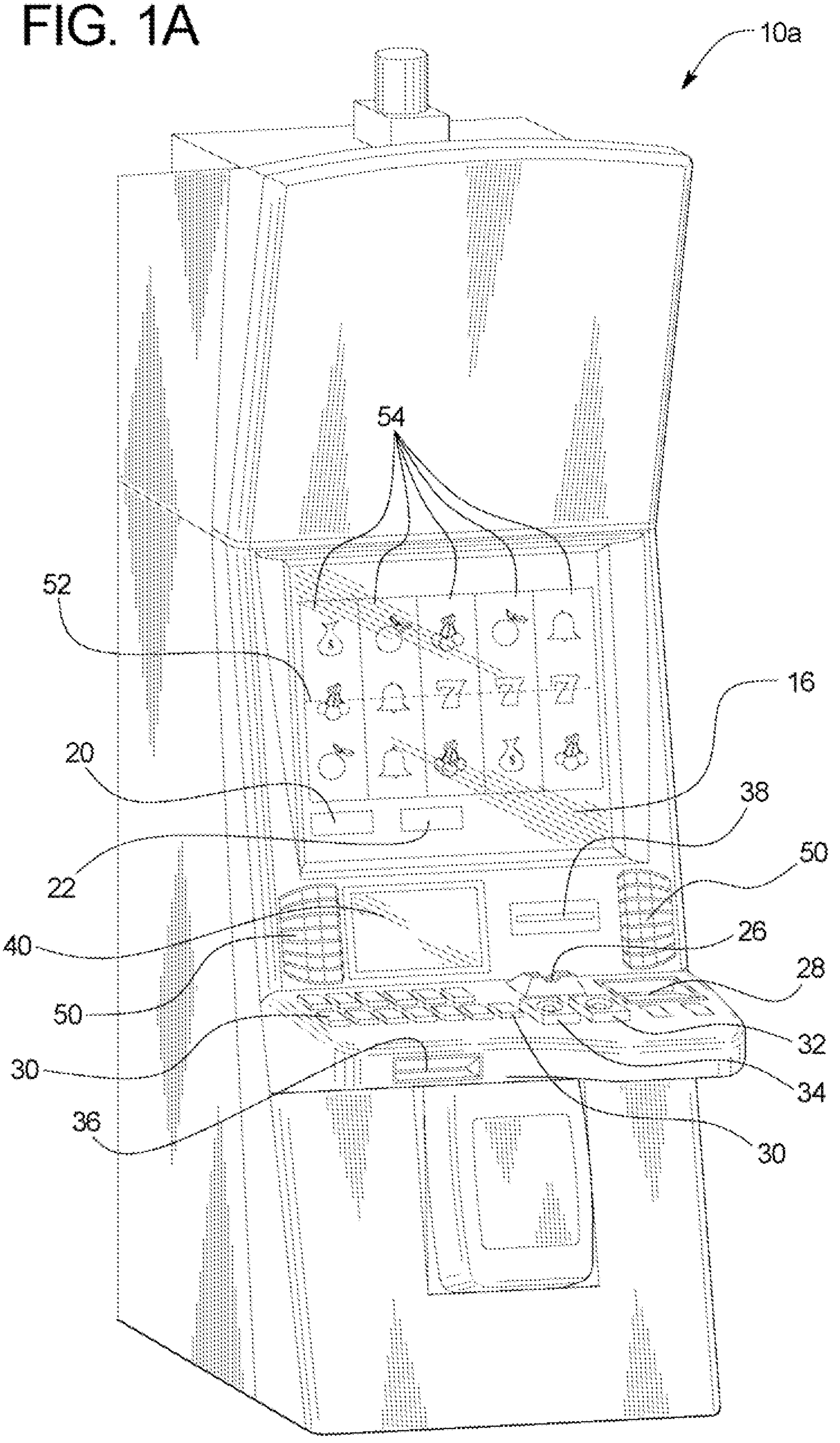
FIGS. 1A and 1B are perspective views of example alternative embodiments of the gaming device of the present disclosure.
Figure 1B:
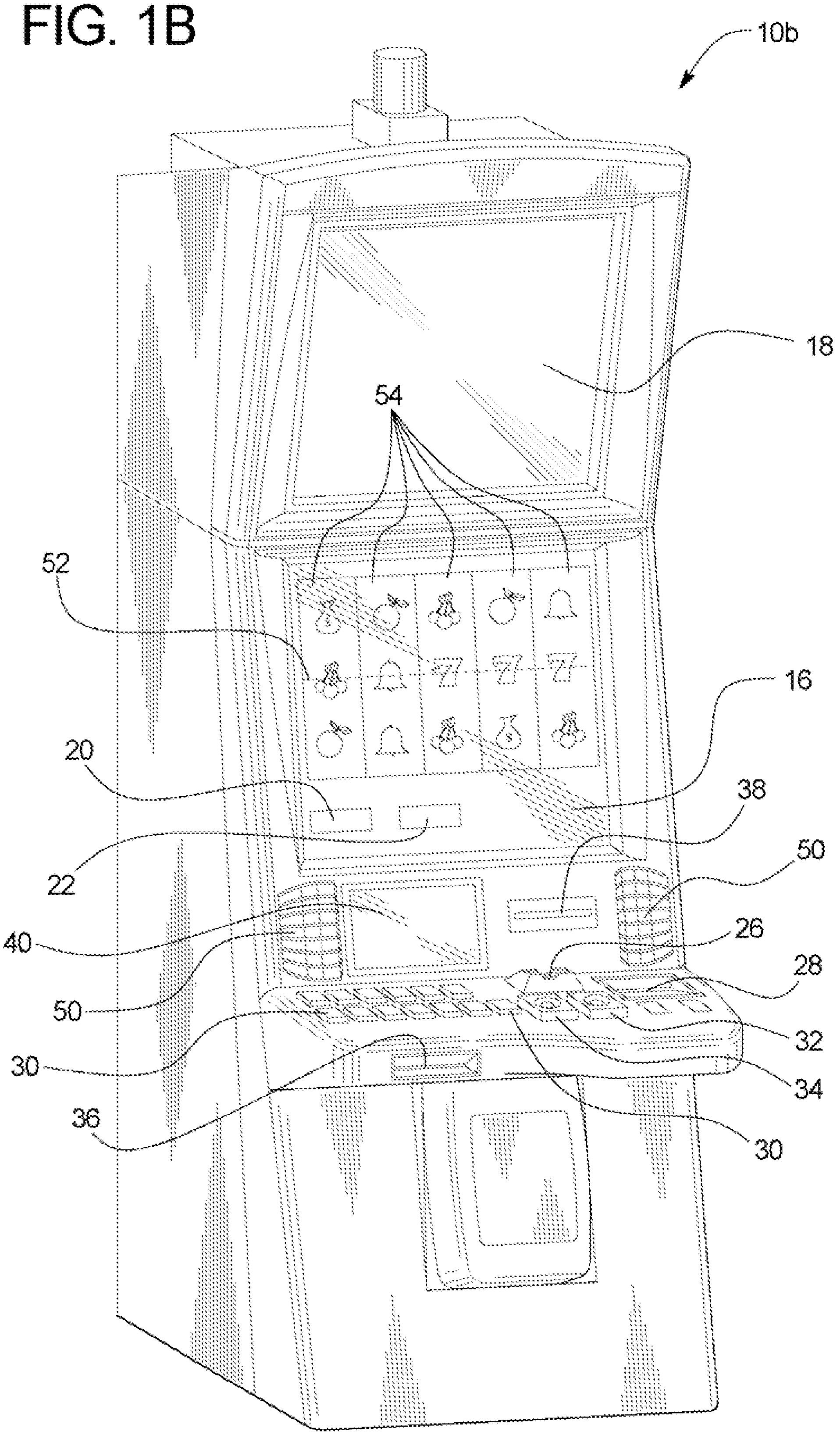

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
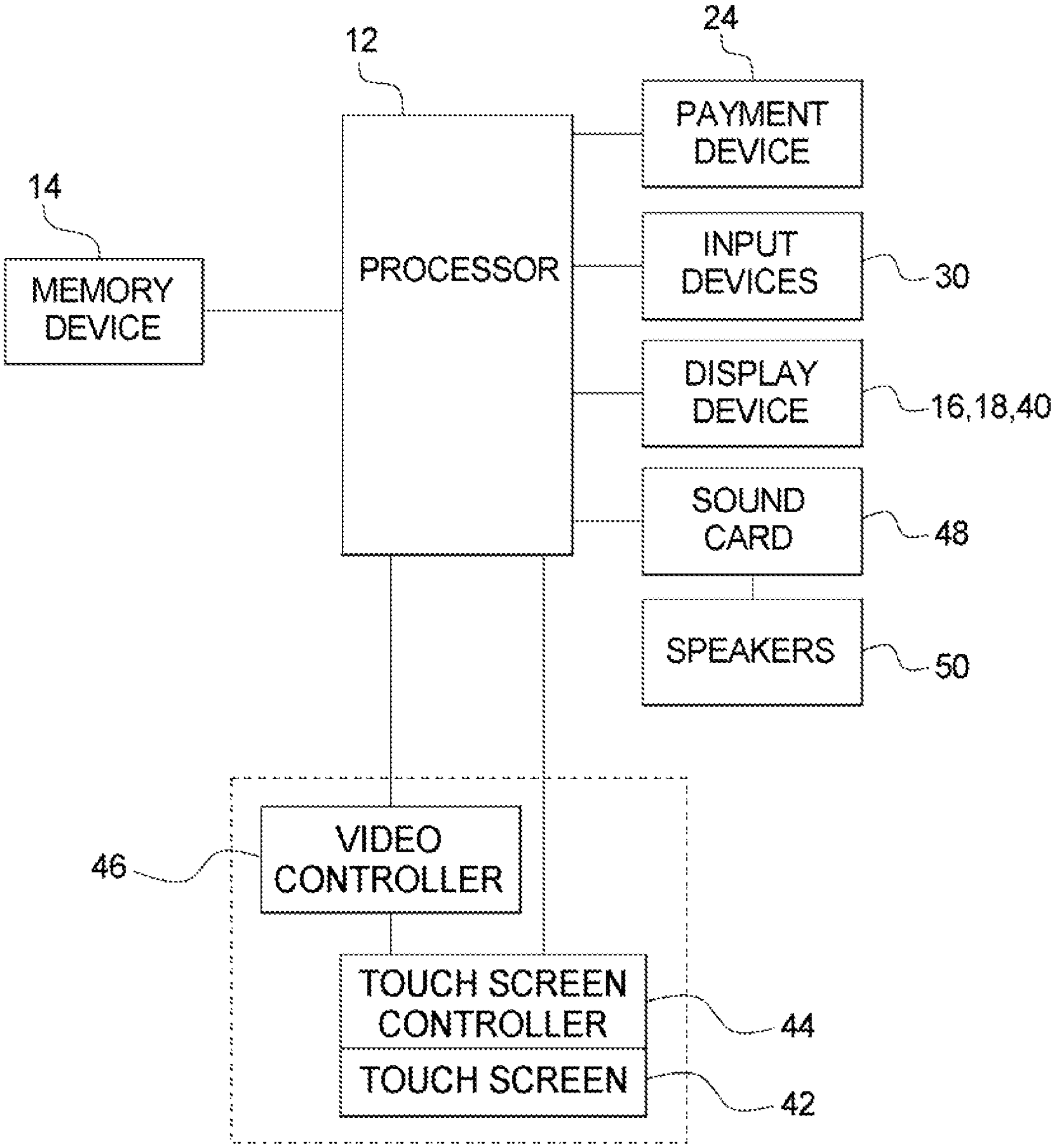
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a hand-held device, such as a personal digital assistant (PDA), a portable computing or mobile device, or another computerized platform to implement the present disclosure. In one embodiment, the gaming device or gaming machine disclosed herein is operable over a wireless network, for example as part of a wireless gaming system. In one such embodiment, the gaming machine may be a hand-held device, a mobile device, or any other suitable wireless device that enables a player to play any suitable game at a variety of different locations. In various embodiments in which the gaming device or gaming machine is a hand-held device, a mobile device, or any other suitable wireless device, at least one memory device and at least one processor which control the game or other operations of the hand-held device, mobile device, or other suitable wireless device may be located: (a) at the hand-held device, mobile device or other suitable wireless device; (b) at a central server or central controller; or (c) any suitable combination of the central server or central controller and the hand-held device, mobile device or other suitable wireless device. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol display positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol display positions on a first reel by the number of symbols generated in active symbol display positions on a second reel by the number of symbols generated in active symbol display positions on a third reel and so on for each reel of the gaming device with at least one symbol generated in an active symbol display position. For example, a three reel gaming device with three symbols generated in active symbol display positions on each reel includes 27 ways to win (i.e., 3 symbols on the first reel×3 symbols on the second reel×3 symbols on the third reel). A four reel gaming device with three symbols generated in active symbol display positions on each reel includes 81 ways to win (i.e., 3 symbols on the first reel×3 symbols on the second reel×3 symbols on the third reel×3 symbols on the fourth reel). A five reel gaming device with three symbols generated in active symbol display positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol display positions by one or more of the reels modifies the number of ways to win.

In another embodiment, the gaming device enables a player to wager on and thus activate symbol display positions. In one such embodiment, the symbol display positions are on the reels. In this embodiment, if based on the player's wager, a reel is activated, then each of the symbol display positions of that reel will be activated and each of the active symbol display positions will be part of one or more of the ways to win. In one embodiment, if based on the player's wager, a reel is not activated, then a designated number of default symbol display positions, such as a single symbol display position of the middle row of the reel, will be activated and the default symbol display position(s) will be part of one or more of the ways to win. This type of gaming machine enables a player to wager on one, more than one or all of the reels and the processor of the gaming device uses the number of wagered on reels to determine the active symbol display positions and the number of possible ways to win. In alternative embodiments, (1) no symbols are displayed as generated at any of the inactive symbol display positions, or (2) any symbols generated at any inactive symbol display positions may be displayed to the player but suitably shaded or otherwise designated as inactive.

In one embodiment wherein a player wagers on one or more reels, a player's wager of one credit may activate each of the three symbol display positions on a first reel, wherein one default symbol display position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol display positions on a first reel, each of the three symbol display positions on a second reel and each of the three symbol display positions on a third reel wherein one default symbol display position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol display position on a first reel forms part of a winning symbol combination with or is otherwise suitably related to a symbol generated in an active symbol display position on a second reel. In this embodiment, the gaming device classifies each pair of symbols which form part of a winning symbol combination (i.e., each pair of related symbols) as a string of related symbols. For example, if active symbol display positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol display positions (i.e., as opposed to a quantity of awards being based on how many paylines that would have passed through each of the strings of related symbols in active symbol display positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
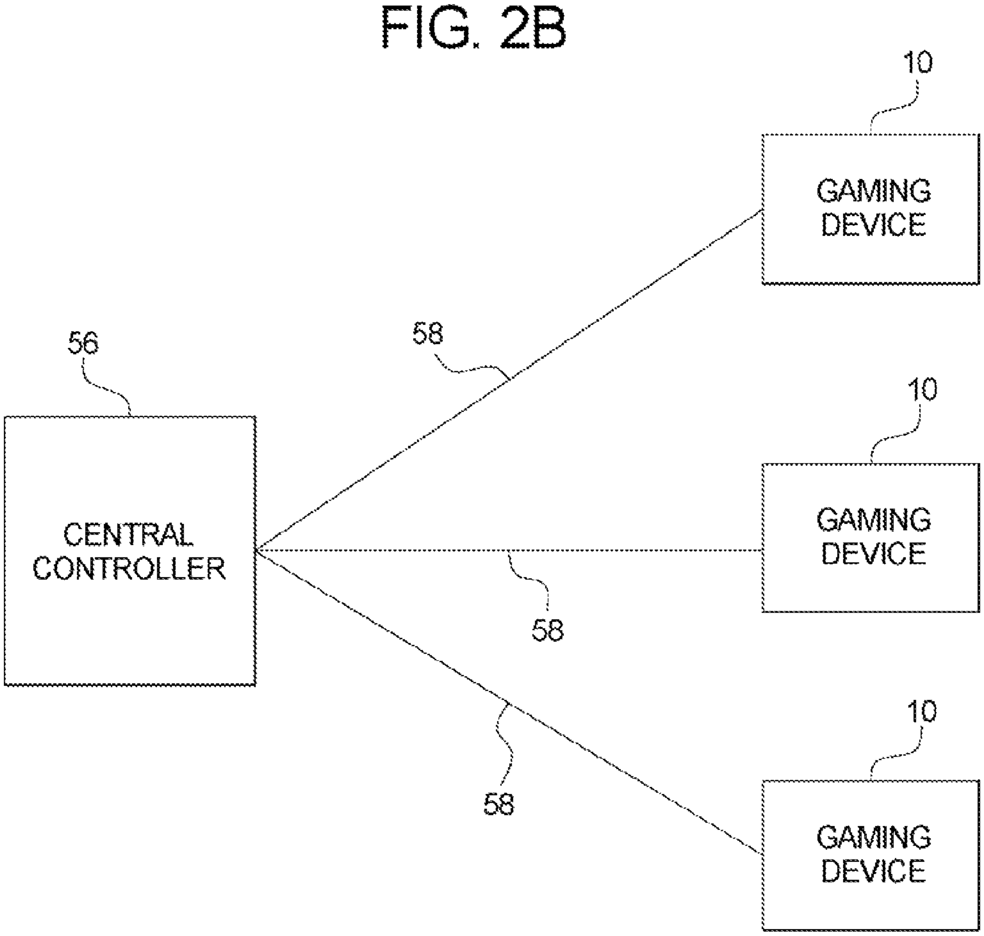
FIG. 2B is a schematic block diagram of one embodiment of a network configuration for a plurality of gaming devices disclosed herein.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed.

In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Side Wagering

Figure 3:
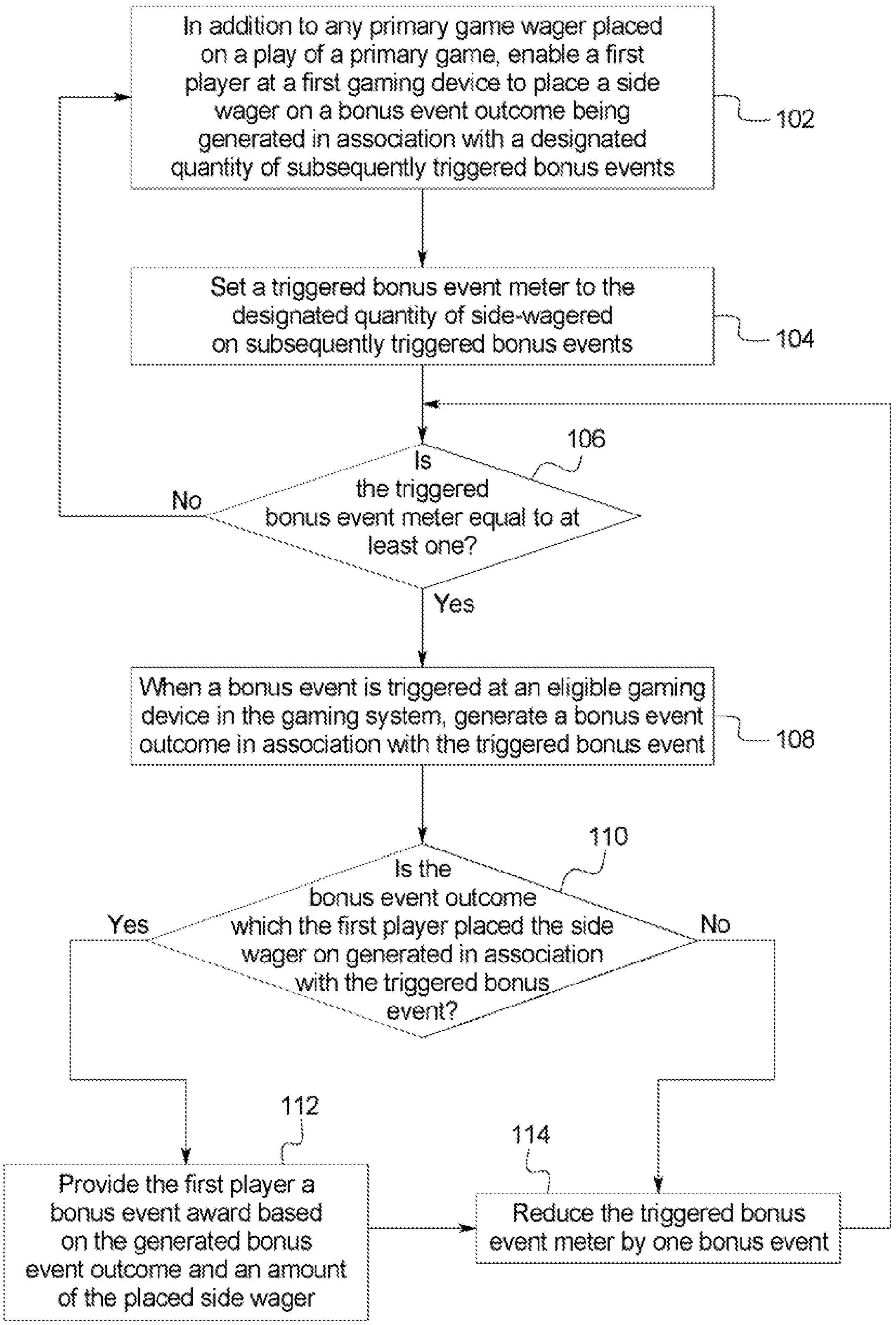
FIG. 3 is a flow chart an example process for operating a gaming system which enables a player to place a side wager on a specific outcome being generated in each of a quantity of one or more bonus events which will subsequently occur in association with one or more gaming devices in the gaming system.

Referring now to FIG. 3, a flowchart of an example embodiment of a process for operating a gaming system or a gaming device disclosed herein is illustrated. In one embodiment, this process is embodied in one or more software programs stored in one or more memories and executed by one or more processors or servers. Although this process is described with reference to the flowchart illustrated in FIG. 3, it should be appreciated that many other methods of performing the acts associated with this process may be used. For example, the order of certain steps described may be changed, or certain steps described may be optional.

In one embodiment, in addition to the above-described primary game wager placed on a play of a primary game, the disclosed gaming system enables a first player at a first gaming device in the gaming system to place a side wager on a bonus event outcome being generated in association with a designated quantity of subsequently triggered bonus events as indicated in block 102. In different embodiments, the quantity of subsequently triggered bonus events includes one subsequently triggered bonus event or a plurality of subsequently triggered bonus events. In one such embodiment, the quantity of bonus events in the designated quantity of bonus events is based on the amount of the player's side wager. In this embodiment, the greater the amount of the player's side wager, the greater the quantity of subsequently triggered bonus events which the player may qualify to win an award.

Figure 4A:
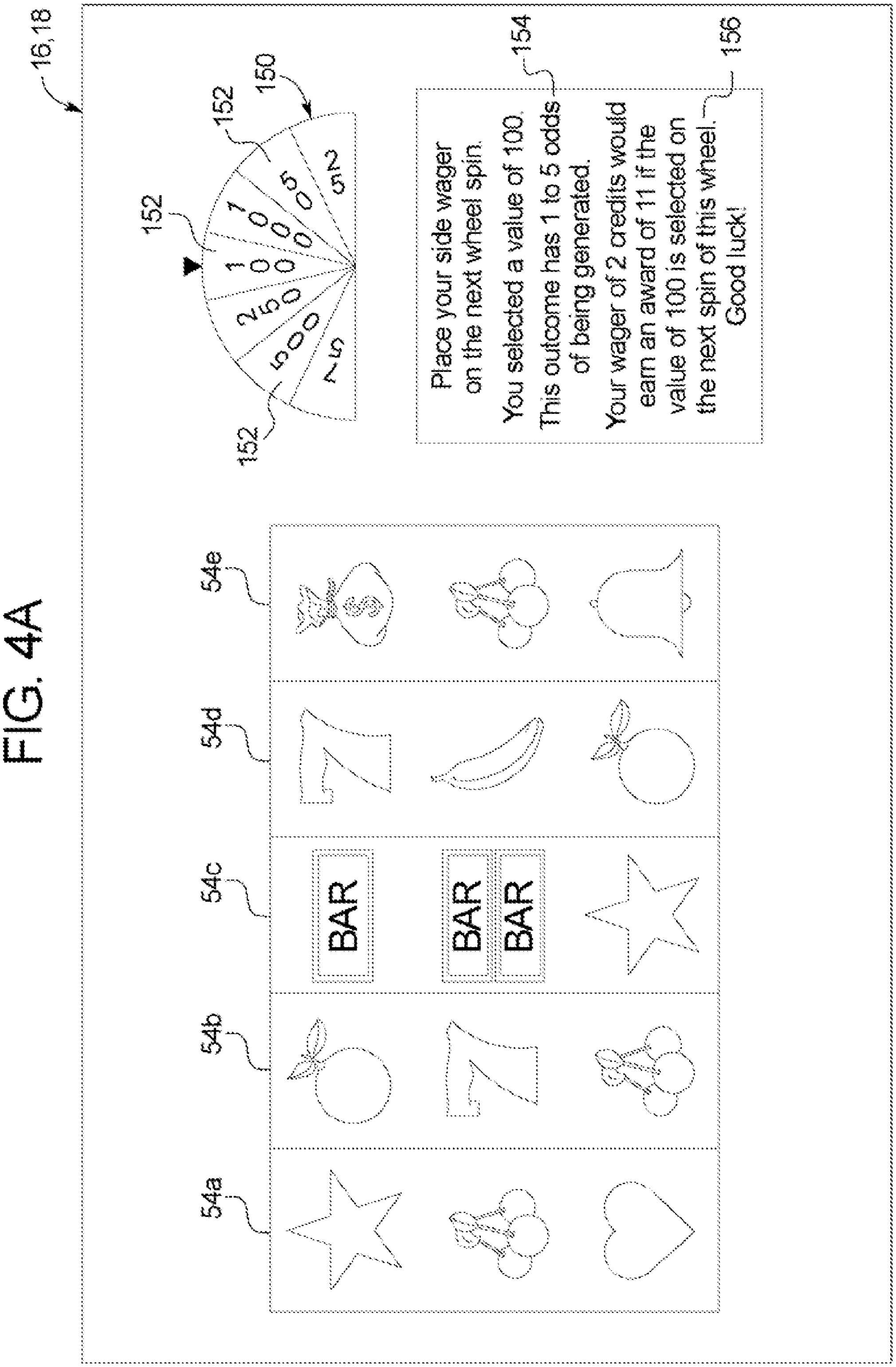
FIG. 4A is a front view of a display of one embodiment of the gaming system disclosed herein illustrating a player placing a side wager on a specific outcome being generated in a subsequently occurring bonus event triggered in association with an eligible gaming device in the gaming system.

In one embodiment, the gaming system enables the first player to place a side bet on the same bonus event outcome being generated in association with each of the designated quantity of subsequently triggered bonus events. For example, as seen in FIG. 4A, the subsequently triggered bonus event includes an award generator 150, such as a bonus wheel, which random selects a value 152 from a plurality of different values. In one example embodiment, the award generator is a video bonus wheel associated with at least one gaming device in the gaming system. In another example embodiment, the award generator is a video representation of a mechanical bonus wheel associated with at least one gaming device in the gaming system. In another example embodiment, the award generator is a shared multi-outcome display, such as a wheel positioned adjacent to each of a plurality of adjacently arranged gaming devices which are positioned and spaced apart substantially equally about the perimeter of the shared display. In this example embodiment, the shared display has a plurality of individual sections and a value displayed at each section, wherein the individual values are fixed relative to each other. In these example embodiments, the gaming system enables the player to select a specific value (i.e., select a specific bonus event outcome) to place a side wager on. In one such embodiment, the gaming system enables the player to touch the bonus wheel and rotate the bonus wheel, either in a clockwise direction or a counter-clockwise direction, to select a specific value for the player to place one or more side wagers on.

As further seen in FIG. 4A, in this illustrated embodiment, for each different value which the player may select, the gaming system is configured to: (i) determine and display the odds of that value being selected in a subsequently triggered bonus event 154, and (ii) determine and display the award which would be provided to the player based on that value being selected in a subsequently triggered bonus event and that side bet being placed 156. In this illustrated example, the gaming system provides appropriate messages such as "PLACE YOUR SIDE WAGER ON THE NEXT WHEEL SPIN", YOU SELECTED A VALUE OF 100", THIS OUTCOME HAS 1 TO 5 ODDS OF BEING GENERATED", "YOUR WAGER OF 2 CREDITS WOULD EARN AN AWARD OF 11 IF THE VALUE OF 100 IS SELECTED ON THE NEXT SPIN OF THIS WHEEL" and "GOOD LUCK!" to the player visually, or through suitable audio or audiovisual displays.

In another embodiment, the gaming system enables the first player to place a side bet on different bonus event outcomes being generated in association with a plurality of the designated quantity of subsequently triggered bonus events. For example, the gaming system enables the first player to place a side wager that a first bonus event outcome will be generated in association with a first subsequently triggered bonus event and that a second, different bonus event outcome will be generated in association with a second subsequently triggered bonus event.

In one embodiment, the gaming system enables the first player to place a side bet on the bonus event outcome being generated in a bonus event triggered in association with a specific eligible gaming device in the gaming system. In one such embodiment, the eligible gaming device is the first player's own gaming device. In another such embodiment, the eligible gaming device is a different gaming device being played by a second player.

In another embodiment, the gaming system enables the first player to place a side bet on the bonus event outcome being generated in a bonus event triggered in association with any of a plurality or group of specific gaming devices in the gaming system. In one such embodiment, the gaming system selects the gaming devices to be included in the group of specific gaming devices based on one or more factors, such as if such gaming devices are being actively played and/or an amount of wagering activity of such gaming devices. In another such embodiment, the gaming system enables the player to select the gaming devices to be included in the group of specific gaming devices.

In another embodiment, the gaming system enables the first player to place a side bet on the bonus event outcome being generated in a bonus event triggered in association with any of the gaming devices in the gaming system. In one such embodiment, the gaming devices in the gaming system include the gaming devices at the gaming establishment where the player is currently playing and also gaming devices at additional gaming establishments. In another embodiment, the gaming system enables the first player to place one or more side bet on one or more bonus event outcomes from a location remote from any gaming establishment (e.g., from a home computer).

Figure 4B:
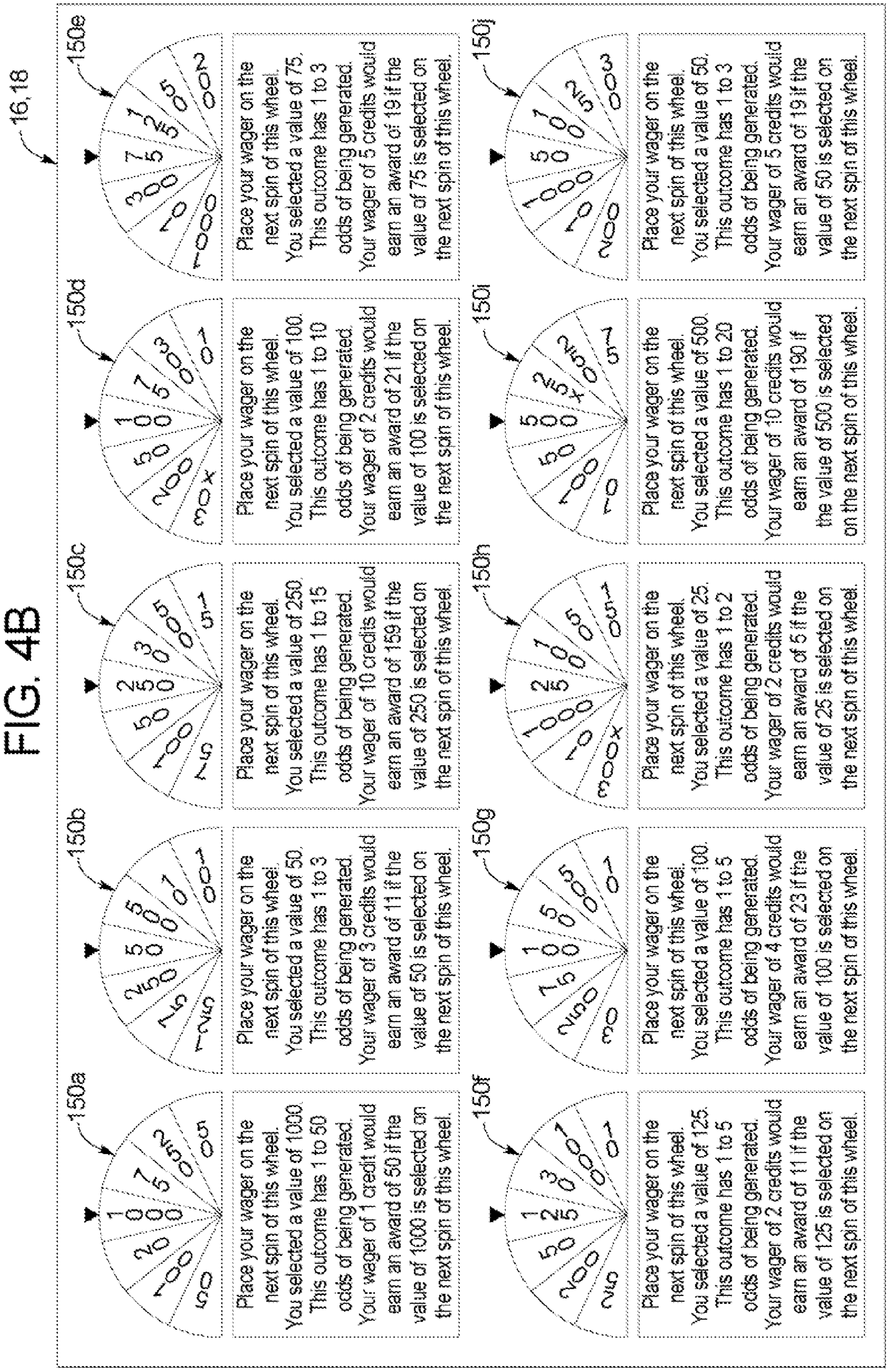
FIG. 4B is a front view of a display of another embodiment of the gaming system disclosed herein illustrating a player placing a plurality of side wagers on a plurality of specific outcomes being generated in a plurality of subsequently occurring bonus events triggered in association with one or more eligible gaming devices in the gaming system.

Since certain gaming devices in the gaming system are associated with different bonus events, certain embodiments disclosed herein enable the player to place a side bet on one or more bonus event outcomes being generated in different bonus events triggered in association with different gaming devices in the gaming system. In one such embodiment, the gaming system enables the player to place a plurality of side bets or side wagers sequentially and/or simultaneously on a plurality of different subsequently triggered bonus events associated with a plurality of different gaming devices. For example, as seen in FIG. 4B, a plurality of different gaming devices are each associated with a separate award generator 150*a* to 150*j*. In this example, each separate award generator, such as each separate wheel, of each gaming device is associated with a separate bonus event configured to randomly select a different award, such as a value or modifier, from a plurality of different awards. It should be appreciated that in this example, because each separate award generator is associated with a separate bonus event, the same value selected by the player on two different award generators may be associated with the same odds of being generated (e.g., the value of fifty selected on award generators 150*b* and 150*j*) or associated with different odds of being generated (e.g., the value of one-hundred selected on award generators 150*d* and 150*g*). It should be further appreciated that in this illustrated example, each separate award generator is associated with a separate bonus event and each separate award generator (i.e., each separate bonus event) includes different awards and/or types of awards available to be generated in association with an activation of that award generator (i.e., a triggering of that bonus event).

As further seen in FIG. 4B and as described above, for each different award which the player may select for each different bonus event, the gaming system is configured to: (i) determine and display the odds of that award being selected in a subsequently triggered bonus event, and (ii) determine and display the total award which would be provided to the player based on that award being selected in a subsequently triggered bonus event and that side bet being placed. In this illustrated example and as seen in FIG. 4B, the gaming system provides appropriate messages to the player visually, or through suitable audio or audiovisual displays.

In one embodiment, as seen in FIGS. 4A and 4B, the gaming system enables a player to place any of the side wagers disclosed herein utilizing one or more service windows of a gaming device, such as the service windows described in U.S. Published Patent Application No. 2007/0243934, U.S. Published Patent Application No. 2007/0243928, U.S. Published Patent Application No. 2008/0009344, U.S. Published Patent Application No. 2009/0104954, and/or U.S. Published Patent Application No. 2009/0233705.

After enabling the first player to place a side wager, the gaming system sets a triggered bonus event meter to the designated quantity of side-wagered on subsequently triggered bonus events as indicated in block 104 of FIG. 3. This triggered bonus event meter tracks the quantity of bonus events which have subsequently occurred (which the first player participated in) since the placement of the side wager on a quantity of subsequently occurring bonus events. That is, since this embodiment provides that the player will participate in a certain quantity of future bonus events (i.e., bonus events which occur after the placement of the side wager), the utilization of the triggered bonus event meter assures that the player qualifies in such future bonus events. The gaming system then determines if the triggered bonus event meter is equal to at least one as indicated in diamond 106.

If the triggered bonus event meter is not equal to at least one (i.e., equal to zero), the gaming system returns to block 102 and enables the first player to place another side wager on a bonus event outcome generated in association with another designated quantity of subsequently triggered bonus events.

On the other hand, if the triggered bonus event meter is equal to at least one, the gaming system monitors for an occurrence of a bonus event associated with the placed side bet. That is, as indicated in block 108, when a bonus event is triggered at an eligible gaming device, the gaming system generates a bonus event outcome in association with the triggered bonus event. For example, if the award generator 150 of FIG. 4A is utilized in a side-wagered on bonus event, upon determining that an eligible gaming device in the gaming system triggered this side-wagered on bonus event, the gaming system activates the award generator to spin to randomly select a value (i.e., generate a bonus event outcome) from the plurality of different values displayed by the award generator.

After generating a bonus event outcome in associated with the triggered bonus event, as indicated in diamond 110 of FIG. 3, the gaming system determines if the bonus event outcome which the first player placed the side wager on was generated in association with the triggered bonus event. For example, if the award generator 150 of FIG. 4A is utilized in a side-wagered on bonus event, the gaming system determines if the value selected by the activated award generator is the same value selected by the player to place a side wager on.

If the gaming system determines that the bonus event outcome which the first player placed the side wager on was generated in association with the triggered bonus event, as indicated in block 112 of FIG. 3, the gaming system provides the first player a bonus event award. This bonus event award is based on the generated bonus event outcome and an amount of the side wager placed. For example, if: (i) the award generator 150 of FIG. 4A is utilized in a side-wagered on bonus event, (ii) the player placed a side wager of two credits on the next spin of the award generator resulting in the segment displaying the value of one-hundred (with one to five odds provided to the player) and (iii) the next spin of the award generator resulted in the award generator randomly selecting the segment displaying the value of one-hundred, then the gaming system provides the player a bonus event award of eleven credits for the two credits wagered.

After providing the player a bonus event award or determining that the bonus event outcome which the first player placed the side wager on was not generated in association with the triggered bonus event, as indicated in block 114 of FIG. 3, the gaming system reduces the triggered bonus event meter by one bonus event. The gaming system then returns to diamond 106 and proceeds, as described above, with determining if the triggered bonus event meter is equal to at least one.

It should be appreciated that since the gaming system disclosed herein enables the player to participate in each of the side-wagered on bonus event(s) regardless of when such bonus events are triggered and regardless of which gaming device(s) in the gaming system is associated with the triggering of such bonus events, in certain situations, the player is no longer playing a gaming device in the gaming system when the bonus event occur. Accordingly, in one embodiment, after the triggering of a bonus event and the determination of whether to provide any bonus event award to the player, the gaming system causes a suitable notification to be sent to the player that placed the side wager but is no longer playing the same gaming device. This notification informs the player about the result of the side-wagered on bonus event. In this embodiment, the notification may be provided in the form of a message sent to the gaming device at which the player is currently playing. If the player is not playing in the gaming system or cannot be located at another gaming device, the notification may be sent in any other manner, such as through telephone, e-mail or any other suitable medium. In one embodiment, an electronic kiosk at a gaming establishment may be used to provide such notification and enable the player to claim any bonus event award. Alternatively, such notification is displayed on a website accessible to the player which provides instructions for the player to claim the bonus event award at the gaming establishment. In one instance, the player must return to the gaming establishment to claim the bonus event award.

As described above with respect to FIG. 3, in certain embodiments disclosed herein, the gaming system enables a player to place a side bet or side wager on one or more outcomes associated with one or more bonus events regardless of which gaming device causes or is associated with the triggered bonus event and regardless of how much time elapses or how many games are played between the placement of the side wager and the actual triggering of the side-wagered on bonus event. In one such embodiment, the gaming system enables a player to place a side wager on a specific outcome being generated in one or more bonus events subsequently triggered in association with the player's own gaming device. In another such embodiment, the gaming system enables a player to place a side wager on a specific outcome being generated in one or more group bonus events subsequently triggered in association with the player's own gaming device. In another such embodiment, the gaming system enables a player to place a side wager on a specific outcome being generated in one or more bonus events and/or one or more group bonus events subsequently triggered in association with any gaming device in the group of gaming devices in the gaming establishment or casino. In another such embodiment, the gaming system enables a player to utilize a suitable handheld device to place a side wager on a specific outcome being generated in one or more bonus events and/or one or more group bonus events subsequently triggered in association with any gaming device in the gaming establishment or casino. In these embodiments, in addition to participating in the bonus event or group bonus event if the player qualifies (i.e., based on an outcome of the player's primary game or a mystery qualification), the player is enabled to participate in the bonus event or group bonus event based on the player's side wager on a specific outcome being generated in the triggered bonus event. That is, regardless of if the player causes the triggering of the bonus event or another player at another gaming device causes the triggering of the bonus event, the player's side wager enables the player to participate in the play of the triggered bonus event.

Figure 5:
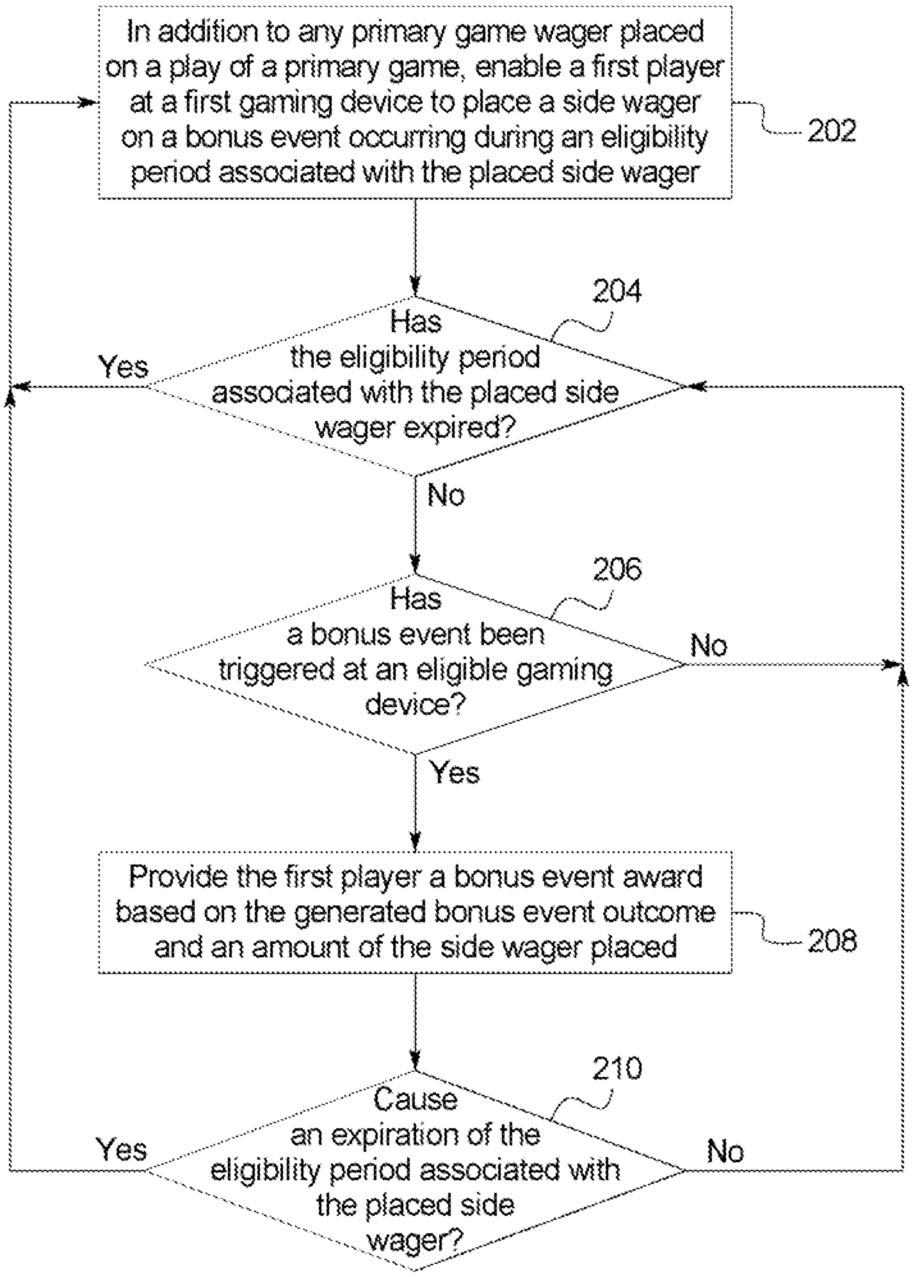
FIG. 5 is a flow chart an example process for operating a gaming system which enables a player to place a side wager on the triggering of a bonus event during an eligibility period associated with the placed side wager.

Referring now to FIG. 5, a flowchart of an example embodiment of a process for operating a gaming system or a gaming device disclosed herein is illustrated. In one embodiment, this process is embodied in one or more software programs stored in one or more memories and executed by one or more processors or servers. Although this process is described with reference to the flowchart illustrated in FIG. 5, it should be appreciated that many other methods of performing the acts associated with this process may be used. For example, the order of certain steps described may be changed, or certain steps described may be optional.

In one embodiment, in addition to the above-described primary game wager placed on a play of a primary game, the disclosed gaming system enables a first player at a first gaming device to place a side wager on a bonus event occurring during an eligibility period associated with the placed side wager as indicated in block 202.

In one embodiment, the side wager is associated with an eligibility period of a duration of time, such as a quantity of seconds or minutes since the placement of the side wager. It should be appreciated that in this embodiment, the odds or probability of a bonus event occurring during the duration of time (and thus the average expected payback for the side wager placed) is based on the quantity of games played during the duration of time. Accordingly, the more games played during the duration of time, the more chances of triggering the bonus event and thus the greater average expected payback for the side wager placed. In one such embodiment, to assist the player in placing a side wager on one or more gaming devices which have an above average amount of wagering activity (and thus an above average number of games played and an above average probability of triggering a bonus event during the duration of time), the gaming system displays information to the player regarding the rate of play occurring at one or more other gaming devices in the gaming system.

In another embodiment, the side wager is associated with an eligibility period of a quantity of games played since the placement of the side wager. It should be appreciated that in this embodiment, the odds or probability of a bonus event occurring within the quantity of games played (and thus the average expected payback for the side wager placed) remains the same regardless of how many players at eligible gaming devices are playing. For example, if a player places a side wager that a bonus event will be triggered within the next ten games played, the odds of the bonus event occurring within the next ten games played (and thus the odds of the player winning the side wager placed) are the same regardless of if one player plays all ten games, two players each play five games or ten players each play one game.

Figure 6:
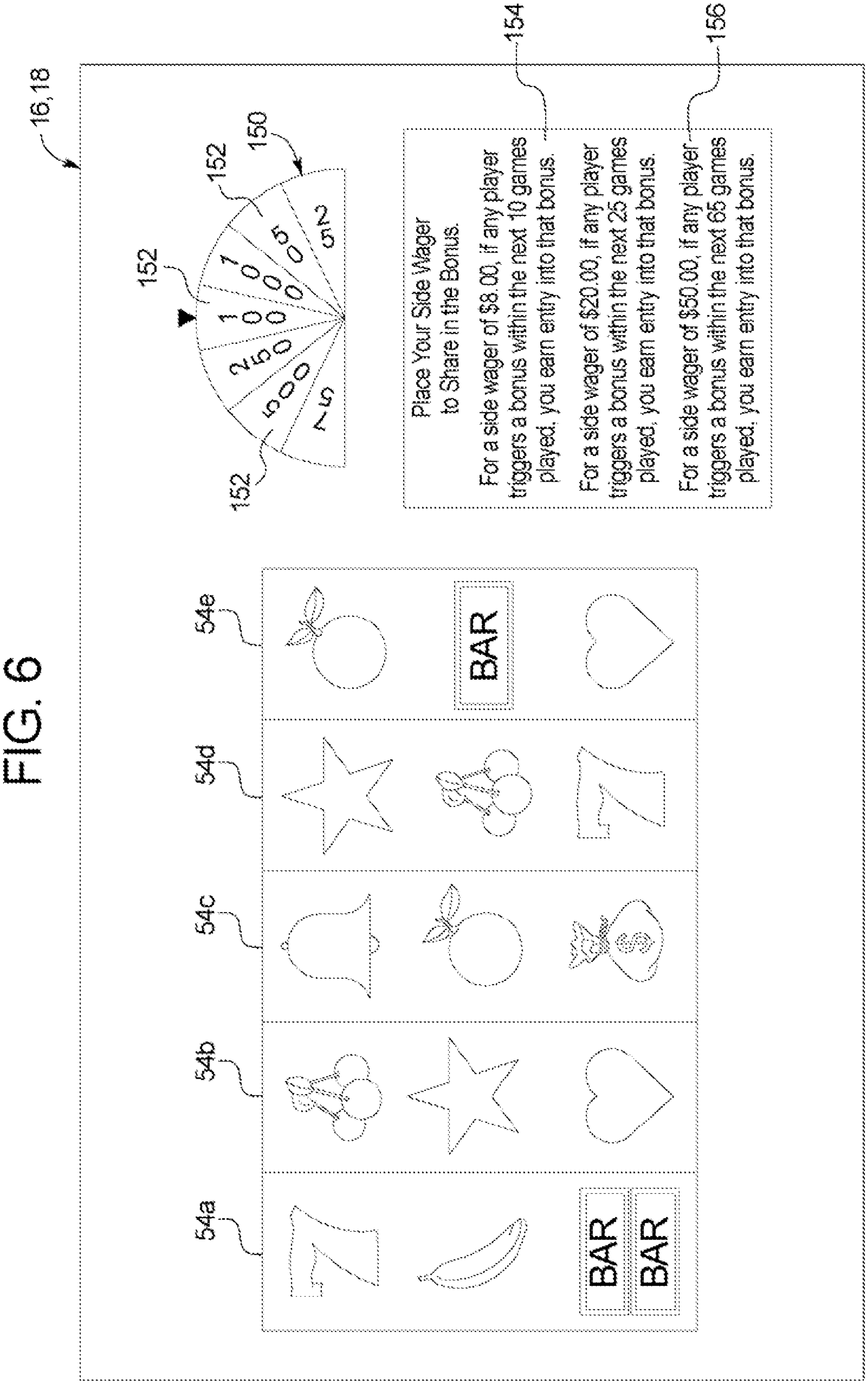
FIG. 6 is a front view of a display of one embodiment of the gaming system disclosed herein illustrating the gaming system enabling a player to place one of a plurality of different side wagers on the triggering of a bonus event during an eligibility period associated with the placed side wager.

In one such embodiment, the gaming system enables the player to place one of a plurality of side wagers wherein each side wager is associated with a different eligibility period. For example, as seen in FIG. 6, the gaming system is configured to determine and display a plurality of side bet options to the player. As seen in FIG. 6, different side bet options (i.e., different side bet amounts) are associated with different eligibility periods for the player to wager on. In this illustrated example, the gaming system provides appropriate messages such as "PLACE YOUR SIDE WAGER TO SHARE IN THE BONUS", "FOR A SIDE WAGER OF $8.00, IF ANY PLAYER TRIGGERS A BONUS WITHIN THE NEXT 10 GAMES PLAYED, YOU EARN ENTRY INTO THAT BONUS", "FOR A SIDE WAGER OF $20.00, IF ANY PLAYER TRIGGERS A BONUS WITHIN THE NEXT 25 GAMES PLAYED, YOU EARN ENTRY INTO THAT BONUS" and "FOR A SIDE WAGER OF $50.00, IF ANY PLAYER TRIGGERS A BONUS WITHIN THE NEXT 65 GAMES PLAYED, YOU EARN ENTRY INTO THAT BONUS" to the player visually, or through suitable audio or audiovisual displays.

In another embodiment, the side wager is associated with an eligibility period of both a duration of time and a minimum quantity of games played. In this embodiment, if the minimum quantity of games played is not reached by the end of the duration of time, the eligibility period extends until the minimum quantity of games are played. For example, a player may place a side wager that a bonus event will be triggered in the earlier of ten games played or sixty seconds.

In one embodiment, the side wager is associated with the triggering of one or more bonus events at the first player's own gaming device. That is, in this embodiment, the first player is placing a side bet that a quantity of one or more bonus events will occur in association with the first player's gaming device during the eligibility period associated with the placed side bet. For example, the first player places a side wager that two bonus events will be triggered at the first player's gaming device in the next ninety seconds (or within the next eighteen primary games played).

In another embodiment, the side wager is associated with the triggering of one or more bonus events at a second player's gaming device. In this embodiment, the first player is placing a side bet that a quantity of one or more bonus events will occur in association with a player's gaming device during the eligibility period associated with the placed side bet. For example, the first player places a side wager that two bonus events will be triggered at a second player's gaming device in the next ninety seconds (or within the next eighteen primary games played).

In another embodiment, the side wager is associated with the triggering of one or more bonus events at a plurality of gaming devices. In this embodiment, the first player is placing a side bet that a quantity of one or more bonus events will occur in association with a plurality of gaming devices during the eligibility period associated with the placed side bet. For example, the first player places a side wager that, from a group of ten eligible gaming devices, five bonus events will be triggered within the next nine minutes (or within the next one-hundred primary games played amongst the ten eligible gaming devices).

After enabling the first player to place the side wager, the gaming system determines if the eligibility period associated with the placed side wager has expired as indicated in diamond 204. In one such embodiment wherein the side wager is associated with an eligibility period of a duration of time, the gaming system determines if the duration of time since the placement of the side wager has elapsed. In another such embodiment wherein the side wager is associated with an eligibility period of a quantity of games played, the gaming system determine if the quantity of games played (at any eligible gaming device which is configured to trigger the side-wagered on bonus event) since the placement of the side wager has been reached.

If the eligibility period associated with the placed side wager has expired, the gaming system returns to block 202 and again enables the first player to place another side wager as described above. It should be appreciated that if the eligibility period expires before any bonus events are triggered, the placed side bet is lost and the gaming system does not provide the player any bonus event awards in association with the placed side bet. That is, this embodiment of the present disclosure is configured to enable a player to place one or more side bets associated with one or more bonus events, wherein the player's actual participation in the bonus event is conditioned upon the bonus event actually occurring during an eligibility period associated with the placed side bet. Such a gaming system increases a level of excitement and enjoyment for players by enabling a player to place a side bet on a bonus event which may or may not occur during a designated period of time.

As indicated in diamond 206, if the gaming determines that the eligibility period associated with the placed side wager has not expired, the gaming system determines if a bonus event has been triggered at an eligible gaming device.

If no bonus event has been triggered at an eligible gaming device, the gaming system return to diamond 204 and again determines if the eligibility period associated with the placed side wager has expired. On the other hand, if a bonus event has been triggered at an eligible gaming device, as indicated in block 208, the gaming system provides the first player a bonus event award. This bonus event award is based on the generated bonus event outcome and an amount of the side wager placed. For example, if: (i) the award generator 150 of FIG. 4A is utilized in a side-wagered on bonus event, (ii) the player placed a side wager of one credit on the next spin of award generator occurring within the next sixty seconds resulting (with one to ten odds provided to the player) and (iii) the next spin of the award generator occurred twenty-five seconds after the placement of the side wager and resulted in the award generator randomly selecting the segment displaying the value of fifty credits, then the gaming system provides the player a bonus event award of ten credits for the one credit wagered.

After providing the player the bonus event award, the gaming system determines whether to cause an expiration of the eligibility period associated with the placed side wager as indicated in diamond 210 of FIG. 5.

In one embodiment, a player is enabled to win an award for the first bonus event triggered within the eligibility period associated with the placed side bet. In this embodiment, after one bonus event is triggered and one bonus event award is provided to the player, the gaming system causes an expiration of the eligibility period associated with the placed side wager. In another embodiment, a player is enabled to win an award for a designated quantity of bonus events triggered within the eligibility period associated with the placed side bet. In this embodiment, after this designated quantity of bonus events are triggered and the designated quantity of bonus event awards are provided to the player, the gaming system causes an expiration of the eligibility period associated with the placed side wager. In another embodiment, there is no limit to the number of bonus events which may be triggered during the eligibility period associated with the placed side wager.

If the gaming system determines to cause an expiration of the eligibility period associated with the placed side wager, the gaming system returns to block 202 and again enables the first player to place another side wager as described above. On the other hand, if the gaming system determines not to cause an expiration of the eligibility period associated with the placed side wager, the gaming system returns to diamond 204 and again determines if the eligibility period associated with the placed side wager has expired.

In one alternative embodiment (not shown), the gaming system enables a player to place a side wager on a bonus event outcome being generated in association with a designated quantity of subsequently triggered bonus events which occur within an eligibility period associated with the placed wager. That is, in addition to being associated with an eligibility period, each side bet placed is also associated with a specific outcome. In this embodiment, if one or more bonus events are triggered (at the player's own gaming device and/or at another eligible gaming device in the gaming system) during the associated eligibility period, the gaming system determines if the bonus event outcome which the player placed the side wager on was generated in association with the triggered bonus event. If the gaming system determines that the bonus event outcome which the player placed the side wager on was generated in association with the triggered bonus event, the gaming system provides the player a bonus event award. On the other hand, if the gaming system determines that the bonus event outcome which the player placed the side wager on was not generated in association with the triggered bonus event, or if the gaming system determines that no bonus event is triggered during the eligibility period, the gaming system does not provide a bonus event award to the player and the player's side bet is lost.

In one embodiment, a primary game wager must be placed in association with or prior to any side wager being placed. In another embodiment, a side wager may be placed without or independent of a primary game wager being placed.

In one embodiment, the gaming system enables a player to switch one or more side wagers placed up until the triggered of the bonus event which that side wager is associated with or otherwise relates to. In one such embodiment, the gaming system utilizes a timer to display to the player an amount of time (or estimated amount or average amount of time) until the triggering of the bonus event which a side wager is associated with. In another embodiment, any placed side wagers remain in effect and cannot be switched or cancelled.

In another embodiment, if a player places a side wager on an occurrence of a bonus event being triggered and that player triggers the bonus event themselves, an additional award opportunity is provided to the player. For example, if a player places a side wager on a bonus event being triggered within a designated period of time and the player's play of a primary game causes the bonus event to be triggered, the gaming system utilizes a modifier of 2× to apply to any award determined in the triggered bonus event. In another if a player places a side wager on a bonus event being triggered within a designated period of time and the player's play of a primary game causes the bonus event to be triggered, the gaming system utilizes an additional feature for the player in play of the triggered bonus, such as an additional activated flipper position. In another embodiment, if a player places a side wager on an occurrence of a bonus event being triggered and that player triggers the bonus event themselves, no additional award opportunity is provided to the player.

In an alternative embodiment, a player's side bet eligibility ends upon participation in a designated quantity of bonus events. In one such embodiment, upon a player participating in a first bonus event, the gaming system sets the triggered bonus event meter to zero. In another such embodiment, upon a player participating in a first bonus event, the gaming system causes the eligibility period associated with the placed side wager to expire. In another embodiment, a player's side bet eligibility lasts for the entire eligibility period (or for each of the designated quantity of side-wagered on subsequently triggered bonus events) irrespective of the number of bonus events the player participates in.

In another embodiment, the gaming system provides each player participating in the bonus event the same bonus award. In another embodiment, the gaming system provides each player participating in the bonus event a same bonus base award which is then modified or multiplied by a value indicative of a player's individual modifier or multiplier. In different embodiments, a player's individual modifier or multiplier is based one or more factors such as: (i) a player's wager amount, (ii) a player's rate of play, (iii) a player's credit balance, (iv) a player's play history, (v) a player's win/loss history, (vi) a player's loyalty program status. In another embodiments, each player participating in a bonus event is provided an independent or individual bonus event award amount. For example, in a wheel based bonus event, the gaming system assigns each active player a different indicator along the edge of the wheel. In this example, at the conclusion of the bonus event, the gaming system provides each player the award indicated by the indicator assigned to that player.

It should be appreciated that while illustrated as a bonus wheel, the bonus event(s) which a player may place one or more side wagers on may include any one or more of the following features:

a. a multiplier;
b. a quantity of modifier symbols;
c. a quantity of picks;
d. a quantity of selections;
e. a quantity of wild symbols;
f. a quantity of wild reels;
g. a quantity of retrigger symbols;
h. a quantity of terminators or termination symbols;
i. a quantity of anti-terminators;
j. a quantity of locking reels;
k. a quantity of locking symbol positions;
l. a quantity of expanding symbols;
m. a quantity of award opportunities;
n. a quantity of progressive awards;
o. a range of available awards;
p. a quantity of active reels;
q. a quantity of active paylines;
r. a quantity of offers;
s. a paytable to be utilized;
t. a quantity of hands of playing cards;
u. a quantity of free spins;
v. a quantity of free activations;
w. a quantity of rounds or levels;
x. any game feature disclosed herein; and
y. any other suitable game feature.

It should be further appreciated that in different embodiments, one or more of:

i. a maximum amount of each side bet placed;
ii. a minimum amount of each side bet placed;
iii. a maximum quantity of subsequently triggered bonus events a player may place a side wager on;
iv. a minimum quantity of subsequently triggered bonus events a player may place a side wager on;
v. a minimum quantity of gaming devices which are eligible to trigger a bonus event in association with the placed side wager;
vi. a maximum quantity of gaming devices which are eligible to trigger a bonus event in association with the placed side wager;
vii. which gaming devices may cause/are associated with a subsequent triggering of a side-wagered on bonus event;
viii. which player or players are eligible to place one or more side wagers;
ix. which gaming devices a player may place one or more side wagers on;
x. which gaming devices to include in the group of gaming devices which a player may place one or more side wagers on;
xi. which bonus event outcomes are available to be side-wagered on by a player;
xii. which types of bonus events a player may place a side-wager on;
xiii. a quantity of games played of the eligibility period associated with a side wager;
xiv. a duration of time of the eligibility period associated with a side wager;
xv. a quantity of triggered bonus events during the eligibility period associated with a side wager which a player is eligible to win a bonus event award;
xvi. any determination disclosed herein;

is predetermined, randomly determined, determined based on a generated symbol or symbol combination, determined based on a random determination by the central controller, determined based on a random determination at the gaming system, determined based on a player's selection, determined based on one or more side wagers placed, determined based on the player's primary game wager, determined based on time (such as the time of day), determined based on an amount of coin-in accumulated in one or more pools, determined based on a status of the player (i.e., a player tracking status), determined based on a status of a gaming device (i.e., active status, inactive status), determined based on an amount of wagering activity by a player or at a gaming device during a designated period of time, or determined based on any other suitable method or criteria.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a plurality of gaming devices, each gaming device including:
  at least one input device,
  at least one display device,
  at least one processor, and
  at least one memory device which stores a plurality of instructions, which when executed by the at least one processor, causes the at least one processor to operate with the at least one input device and the at least one display device to enable a player to place a primary game wager to play a primary game; and at least one controller, said at least one controller configured to communicate with said gaming devices and programmed to:
  (a) enable one of the players of one of the gaming devices to place a side wager, said side wager associated with a designated bonus event outcome being generated in association with a quantity of bonus events, said quantity being greater than zero, wherein said side wager is placed prior to any triggering of any bonus event of the quantity of bonus events; and
  (b) for each triggering of a bonus event of the quantity of bonus events:
    (i) generate a bonus event outcome,
    (ii) cause the generated bonus event outcome to be displayed to at least the player that placed the side wager,
    (iii) determine if the generated bonus event outcome is the designated bonus event outcome associated with the placed side wager,
    (iv) if the generated bonus event outcome is the designated bonus event outcome associated with the placed side wager, cause a bonus event award to be provided to the player that placed the side wager, an amount of said bonus event award being based on an amount of the placed side wager and the generated bonus event outcome, and (v) if the generated bonus event outcome is not the designated bonus event outcome associated with the placed side wager, for the triggered bonus event, cause no bonus event award resulting from the placed side wager to be provided to the player that placed the side wager.

2. The gaming system of claim 1, wherein the quantity of bonus events associated with the placed side wager is greater than one.

3. The gaming system of claim 2, wherein the triggering of the bonus events of the quantity of bonus events occur in association with a plurality of the gaming devices.

4. The gaming system of claim 2, wherein a plurality of the bonus events are each associated with a bonus wheel including a plurality of segments which each display one of a plurality of awards.

5. The gaming system of claim 1, wherein the at least one controller is programmed to enable a plurality of the players of a plurality of the gaming devices to each place a side wager.

6. The gaming system of claim 5, wherein a first of the side wagers placed by a first one of the players is associated with a first designated bonus event outcome and a second of the side wagers placed by a second, different one of the players is associated with a second, different designated bonus event outcome.

7. The gaming system of claim 5, wherein a first of the side wagers placed by a first one of the player is associated with a first quantity of bonus events and a second of the side wagers placed by a second, different one of the players is associated with a second, different quantity of bonus events.

8. The gaming system of claim 5, wherein a first of the side wagers placed by a first one of the player is associated with a first quantity of bonus events and a first designated bonus event outcome and a second of the side wagers placed by a second, different one of the players is associated with a second, different quantity of bonus events and a second, different designated bonus event outcome.

9. The gaming system of claim 1, wherein at least one of the quantity of bonus events includes a bonus wheel including a plurality of segments which each display one of a plurality of awards.

10. A method of operating a gaming system, said method comprising:

(a) enabling a plurality of players of a plurality of gaming devices to each place a primary game wager to play a primary game; and (b) enabling one of the players of one of the gaming devices to place a side wager, said side wager associated with a designated bonus event outcome being generated in association with a quantity of bonus events, said quantity being greater than zero, wherein said side wager is placed prior to any triggering of any bonus event of the quantity of bonus events; and (c) for each triggering of a bonus event of the quantity of bonus events:

(i) causing at least one processor to execute a plurality of instructions to generate a bonus event outcome, (ii) cause at least one display device to the generated bonus event outcome to be displayed to at least the player that placed the side wager, (iii) causing the at least one processor to execute the plurality of instructions to determine if the generated bonus event outcome is the designated bonus event outcome associated with the placed side wager, (iv) if the generated bonus event outcome is the designated bonus event outcome associated with the placed side wager, providing a bonus event award to the player that placed the side wager, an amount of said bonus event award being based on an amount of the placed side wager and the generated bonus event outcome, and (v) if the generated bonus event outcome is not the designated bonus event outcome associated with the placed side wager, for the triggered bonus event, not providing any bonus event award resulting from the placed side wager to the player that placed the side wager.

11. The method of claim 10, wherein the quantity of bonus events associated with the placed side wager is greater than one.

12. The method of claim 11, wherein the triggering of the bonus events of the quantity of bonus events occur in association with a plurality of the gaming devices.

13. The method of claim 11, wherein a plurality of the bonus events are each associated with a bonus wheel including a plurality of segments which each display one of a plurality of awards.

14. The method of claim 10, which includes enabling a plurality of the players of a plurality of the gaming devices to each place a side wager.

15. The method of claim 14, wherein a first of the side wagers placed by a first one of the players is associated with a first designated bonus event outcome and a second of the side wagers placed by a second, different one of the players is associated with a second, different designated bonus event outcome.

16. The method of claim 14, wherein a first of the side wagers placed by a first one of the player is associated with a first quantity of bonus events and a second of the side wagers placed by a second, different one of the players is associated with a second, different quantity of bonus events.

17. The method of claim 14, wherein a first of the side wagers placed by a first one of the player is associated with a first quantity of bonus events and a first designated bonus event outcome and a second of the side wagers placed by a second, different one of the players is associated with a second, different quantity of bonus events and a second, different designated bonus event outcome.

18. The method of claim 10, wherein at least one of the quantity of bonus events includes a bonus wheel including a plurality of segments which each display one of a plurality of awards.

19. The method of claim 10, which is provided through a data network.

20. The method of claim 19, wherein the data network is the internet.

* * * * *

UNITED STATES PATENT AND TRADEMARK OFFICE

CERTIFICATE OF CORRECTION

PATENT NO. : 8,628,412 B2
APPLICATION NO. : 13/221409
DATED : January 14, 2014
INVENTOR(S) : John H. Zielinski et al.

It is certified that error appears in the above-identified patent and that said Letters Patent is hereby corrected as shown below:

IN THE CLAIMS

In Claim 1, Column 30, Line 38, replace “causes” with --cause--.
In Claim 1, Column 30, Line 56, replace “that” with --who--.
In Claim 1, Column 30, Line 64, replace “that” with --who--.
In Claim 1, Column 31, Line 6, replace “that” with --who--.
In Claim 7, Column 31, Line 27, replace “player” with --players--.
In Claim 8, Column 31, Line 32, replace “player” with --players--.
In Claim 10, Column 31, Line 46, delete “and”.
In Claim 10, Column 31, Line 58, replace “cause” with --causing--.
In Claim 10, Column 31, Line 58, between “to” and “the” insert --display--.
In Claim 10, Column 31, Line 59, delete “to be displayed”.
In Claim 10, Column 31, Line 60, replace “that” with --who--.
In Claim 10, Column 32, Line 8, replace “that” with --who--.
In Claim 10, Column 32, Line 17, replace “that” with --who--.
In Claim 16, Column 32, Line 40, replace “player” with --players--.
In Claim 17, Column 32, Line 45, replace “player” with --players--.
In Claim 20, Column 32, Line 58, replace “the” with --an--.

Signed and Sealed this
Twentieth Day of May, 2014

Michelle K. Lee

Michelle K. Lee
*Deputy Director of the United States Patent and Trademark Office*